United States Patent [19]

Andres, IV et al.

[11] 4,043,736

[45] Aug. 23, 1977

[54] TWO-SHUTTLE THERMOFORMING MACHINE

[75] Inventors: Philip J. Andres, IV; John E. Crisler; Sol I. Kalmich, all of Wheaton, Ill.

[73] Assignee: Plastofilm Industries, Inc., Wheaton, Ill.

[21] Appl. No.: 614,339

[22] Filed: Sept. 17, 1975

[51] Int. Cl.$^2$ .............................................. B29C 3/04
[52] U.S. Cl. .................................... 425/397; 425/400
[58] Field of Search ............... 425/397, 400, DIG. 48, 425/398, 383, 394, DIG. 204; 198/137

[56] References Cited

U.S. PATENT DOCUMENTS

| | | | |
|---|---|---|---|
| 2,369,840 | 2/1945 | Nalbach et al. | 198/137 |
| 3,081,489 | 3/1963 | Jackson et al. | 425/DIG. 204 |
| 3,538,211 | 11/1970 | Adomaitis | 425/DIG. 204 |
| 3,669,594 | 6/1972 | Brown et al. | 425/397 X |
| 3,785,762 | 1/1974 | Butzko | 425/397 X |
| 3,787,158 | 1/1974 | Brown et al. | 425/397 X |

*Primary Examiner*—Richard B. Lazarus

*Attorney, Agent, or Firm*—Darbo, Robertson & Vandenburgh

[57] ABSTRACT

In a thermoforming machine for forming products from plastic sheets or the like, two shuttles or sheet-carrying frames shuttle interchangeably between a feeding station and a forming and loading station, with the shuttle which carries the sagging heated sheet passing under the oppositely moving shuttle. At opposite ends of a transverse axis at the longitudinal center of each shuttle, pivotal connections are provided to vertically looped drive chains so that the shuttle can remain right-side up as it follows the looped path of its chains. Rails are provided which support the shuttles and maintain them horizontal as they move. At the forming and loading station, snorkels engage the shuttle stopped there to provide suitable air pressure and discharge connections for operating sheet clamps by double-acting cylinders. The snorkels thrust the shuttle rearwardly against a ratchet, for accurate stop-positioning between snug side-cams.

8 Claims, 14 Drawing Figures

TWO-SHUTTLE THERMOFORMING MACHINE

INTRODUCTION

The invention of which the present disclosure is offered for public dissemination in the event that adequate patent protection is available relates to the field of thermoforming machines. In such machines of the class contemplated, after a sheet thermoplastic material has been clamped in a shuttle at a loading position, the shuttle is moved into an oven for heating, and when sufficiently heated, moved to form a forming position, and when sufficiently heated, moved to a forming position, which may be the loading position. At the forming position platens move molds into engagement with the sheet to reshape it to form the product. Then the formed sheet is removed and a new sheet is inserted.

A machine of this type which has been popular in the past has used a single shuttle shuttling back and forth between the two positions. After a thermoplastic sheet was clamped into the shuttle, it would be moved into the oven, and remain there long enough to be heated. Then it would be moved back to the forming position and remain there long enough to be formed and cooled sufficiently for removal, after which the formed sheet had to be removed and the new sheet inserted. According to the present invention, much of the time occupied by this cycle is saved by using two shuttle frames so that while one is being heated, the other can be formed. The removal and replacement at the forming station, in addition to the forming, can also be performed during heating, if the time required for heating happens to be long enough to so permit. Production is thus greatly increased and in some instances doubled. Furthermore, there is a great saving of energy because the oven is being used for heating almost constantly, instead of dissipating heat while standing idle more than half the time (with increased load on the air conditioning system when one is provided). Also, a lower oven temperature can often be used with further energy-saving and sometimes with increased quality of production because the lower temperature and longer heat time provide more uniform heating of the sheet.

Three-shuttle or three-position thermoforming machines have been known before but they have very expensive and have required considerably more floor space than the popular single-frame machine. According to the present invention, relatively inexpensive changes can be made in the single-frame machine to provide a two-frame machine with the advantages mentioned. No additional floor space is provided.

The foregoing is accomplished by virtue of working out a system in which the shuttles are shuttled between the two positions without conflict. In the preferred form closed loop shuttle chains are used, but without inverting the frames, and without depending on sagging chains for support. Whereas the expensive previous three-frame machines provided a separate loading station, the present invention accomplishes a large share of the increased production of such machines without having a separate loading station. On some jobs, the compact two-station machine yields the same production as a three-station machine.

The advantages and objects of the invention will be more apparent from the following description and from the drawings.

BACKGROUND DESCRIPTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
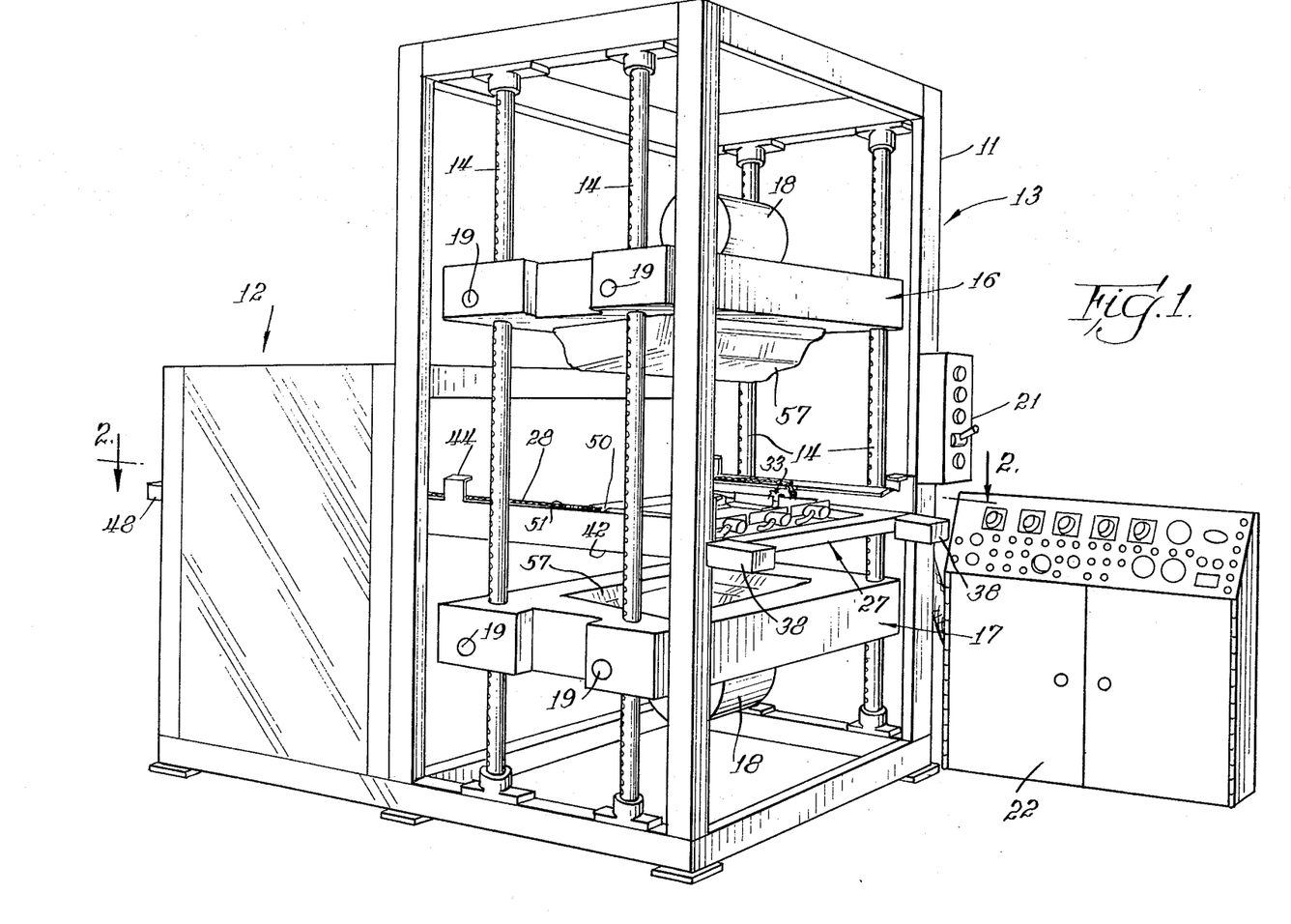
FIG. 1 is a perspective type view of the form of the machine chosen for illustration of the invention.
Figure 2:
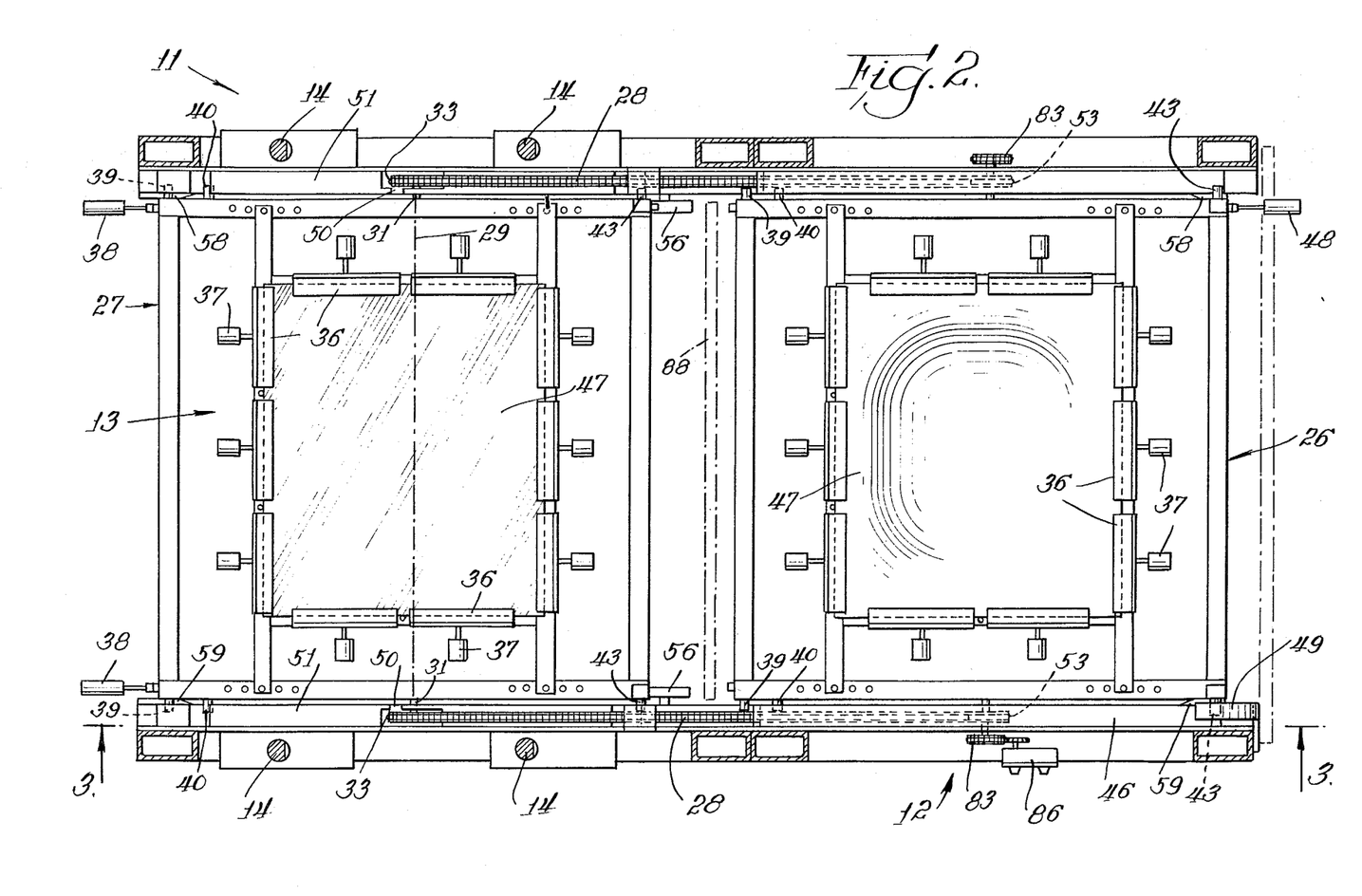
FIG. 2 is a horizontal sectional view through the machine of FIG. 1 looking downwardly approximately on the line 2—2 of FIG. 1, and showing especially the two shuttles, their support rails and the chains for moving them.

Most of the machine as seen in FIG. 1 would not be noticeably different to a casual observer from the prior popular single-frame thermoforming machine. Thus a structural frame 11 provides an oven section 12 and a forming section 13. In the forming section vertical rack bars 14 support upper forming platen 16 and lower forming platen 17. Upper and lower molds, changed for each job are carried by the platens and may be treated as parts of them. Each platen, in the illustrated form, carries its own motor 18 for raising and lowering the platen on the rack-rods 14. Although not illustrated, because old, each motor 18 drives four rack-engaging gears in unison, these gears being carried by the parallel shafts 19. Also, conventional vacuum and electrical connections are omitted for simplicity.

At the front of the machine where the operator stands is located an operator's control box 21 which has the necessary buttons for starting and stopping and the like. A less-frequently used control console 22 may be located at any convenient point. Settings of the adjustments in the console may remain undisturbed for long periods, or throughout the run of one job after the optimum adjustments have been reached.

In the past, a single shuttle with clamps thereon for holding a thermoplastic sheet has been shifted back and forth between the oven section 12 and the forming section 13. A popular machine of this type is that sold as the "Comet Star" by Comet Industries, Inc. of Elk Grove Village, Illinois. Many of its well-known details, used here, need not be described.

TWIN SHUTTLE FRAMES OF THE PRESENT INVENTION

According to the present invention two shuttles 26 and 27 are provided, and by movements forwardly around a circuit they are shuttled back and forth directly between two stations by a pair of shuttle chains 28. Each shuttle is a frame, carrying within its window a sheet-clamping assembly suitable for a particular job. Thus each frame passes repeatedly through the entire of a vertically looped circuit, with stops at, and repeated passes between, two stations; one being a heating station and the other a forming and loading station. The two stations are spaced horizontally; or generally horizontally if different levels would otherwise seem to be excluded.

Figure 14:
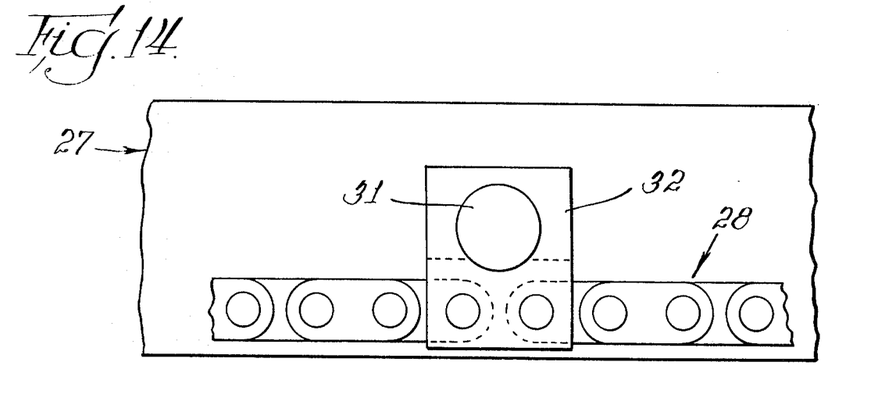
FIG. 14 is a fragmentary view illustrating at one side of a shuttle its pivotal linkage to the shuttle chain.

A key to achieving the simplicity and compactness of the present invention is that although the shuttles 26 and 27 are constantly carried by and are by chains 28 which follow a simple closed loop around only two sprockets, the shuttles do not turn over but stay right-side-up at all times. To this end, each of the shuttles 26 and 27 is pivotally connected to the chains along a mid-axis 29 of the shuttle as will be described especially with respect to the shuttle 27. Thus the shuttle 27 has a stud 31 projecting outwardly on each side along the axis 29; and as best seen in FIG. 14 each stud 31 projects into a bearing link 32 of chain 28. Thus as the bearing link 32 passes around a sprocket 33 from the downstanding position shown in FIG. 4 to the upstanding position shown in FIG. 5, the stud 31 pivots in the bearing link 32 so as to allow the shuttle 27 to remain right side-up. In thus shifting levels, some slight tilting of the shuttle may occur, and is tolerable.

GUIDE AND SUPPORT TRACKS

Except adjacent the sprockets, the chains must not be relied upon as the means of supporting the shuttles, because the chains would sag excessively, and the weight of the shuttles would produce chain-wear. Also, it is apparent that considering only the studs 31, the shuttle 27 would be free to swing about the axis 29 instead of remaining in the desired horizontal position. According to the present invention, the horizontal position is maintained and the weight supported as the shuttles pass one another by tracks as illustrated in FIGS. 3 to 7. In the course of describing the guiding action, it will be convenient also to describe some other aspects of the operation.

Figures 3, 4, 5:
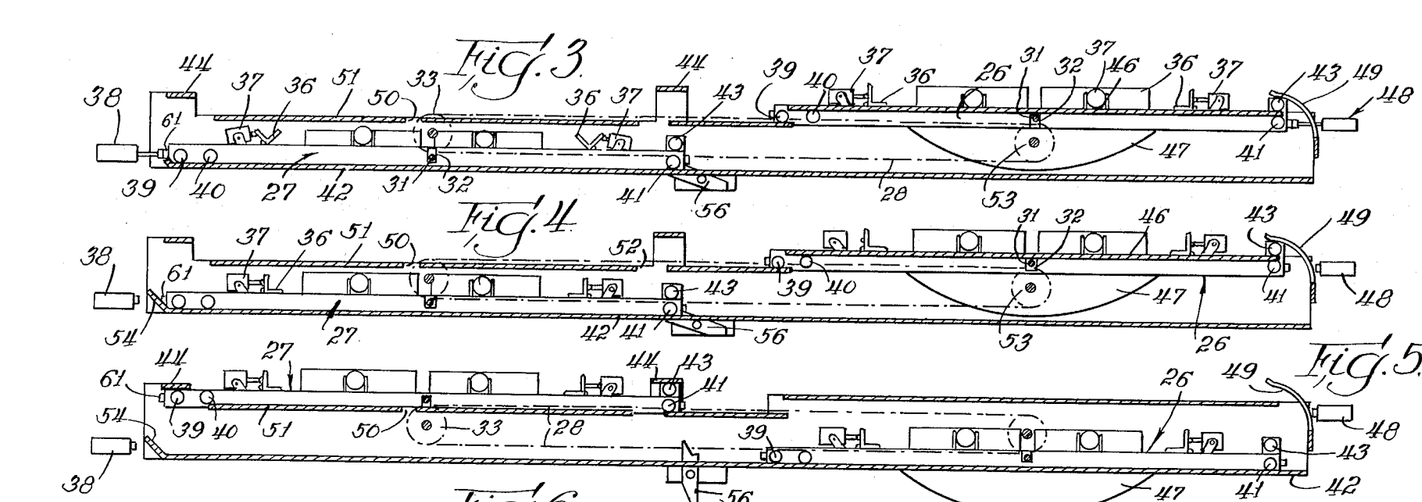
FIGS. 3 to 7 are vertical sectional views taken approximately on the line 3—3 of FIG. 2 and thus showing the "near" side of the shuttles, with their supporting tracks in section. The operator's position is on the left. The successive views show successive positions of the two shuttles.

Starting with FIG. 3, the shuttle 27 is in the forming section 13 of the machine, shown at the right in FIG. 1, although this section is at the left in FIGS. 3 to 7. In FIG. 3 sheet clamps 36 are shown in the open position having been opened by air cylinders 37. After a previously formed sheet has been removed from the clamps 36 and a new sheet inserted into them, the clamps 36 will be closed by reversing the supply of air to the cylinders 37, which are double acting. The air to cylinders 37 is supplied by various snorkel devices illustrated diagrammatically at 38 and 48 in FIGS. 3 to 7. In FIG. 3 the snorkel devices have been extended into engagement with shuttles 26 and 27, while in FIG. 4 they have been retracted to permit the shuttles to move.

The shuttle 27 is held in a horizontal position and supported in FIG. 3 by rollers 39 and 40 at one end of the frame and a roller 41 shown at the other end of the frame 27, all of these rollers resting on bottom track 42. The support tracks and rollers described are duplicated at the far side of the machine, so that each shuttle is supported on both sides by tracks. During most of the description, however, only the rollers on one side will be mentioned, partly because this conforms the description to the showing in most figures.

In FIG. 4, the clamps 36 have been closed by reversing the air supplied to double-acting cylinders 37, and the snorkels 38 and 48 have been removed. Closing pressure is maintained in the cylinders 37 by a reservoir such as an oversize conduit. Shuttles 26 and 27 have not yet started their movement.

In FIG. 5 the sprockets 33 have rotated a half turn, thereby raising the shuttle 27 the few inches between the position of stud 31 in downwardly extending bearing link 32 in FIG. 4 and in its upwardly extending position in FIG. 5. As the shuttle 27 reaches the position shown in FIG. 5, it is held in a horizontal position by virtue of the fact that its rollers 39 and 43 engage stops 44.

Returning now to FIG. 3 and looking at the right-hand side, it is seen that the other shuttle frame 26 is held in the horizontal position by engagement of its various rollers 39, 40, 41 and 43 with guide rails as shown. In this instance most of these rollers engage an upper guide rail 46. The clamps 36 are closed, holding a sheet 47 which is shown in a severely sagging position such as occurs after heating. Actually the sag may be even more than is illustrated. The snorkel assembly 48, shown in engagement with the shuttle 26, is a booster snorkel to replenish the reservoir and be sure that adequate clamp-closing air pressure is maintained during heating and movement to the other position.

Although the parts are in the same position in FIG. 4, that figure shows deflector tracks 49 and 54 which guide rollers 43 and 39, respectively, during the initial movement occurring between the position shown in FIGS. 4 and 5, to make certain the shuttles do not strike retracted snorkels 48 and 38. In FIG. 5 the rollers 39, 40 and 41 have all moved into engagement with the bottom track 42, thus ensuring maintenance of the shuttle in horizontal position and proper support as it passes shuttle 27 in their travel.

Figure 6:
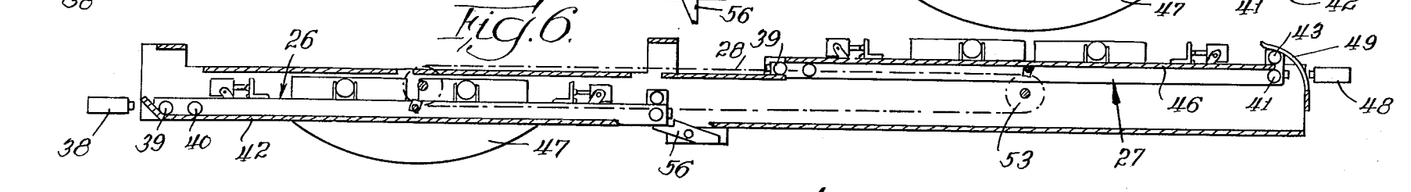

In FIG. 6 the shuttle 26 has been moved to the forming section at the left and the frame 27 has been moved to the oven section at the right. The sheet held by the closed clamps 36 of shuttle 27 has only begun to be heated and hence has not been shown in its sagging position. The snorkel 48 has not yet been extended into engagement with frame 27. Shuttle 27 is now held horizontal in the manner previously described with respect to shuttle 26 and shuttle 26 is held horizontal in the manner previously described with respect to shuttle 27 in FIG. 3.

Throughout the travel from the FIG. 5 position to the FIG. 6 position, the rollers 39, 40 and 41 of the shuttle 26 have rolled along the bottom rail 42 which is a continuous rail.

The guidance and support of shuttles 26 and 27 as each moves from the left to the right in the upper level is not so simple, however. Because of chain-sagging already mentioned, there must be rails under at least one roller of 39 and 40, and one of the rollers of 41 and 43 throughout the period of their movement except when the bearing link 32 is directly adjacent one of the sprockets 33 at which time it is adequately supported by the sprockets. It is apparent, however, that for the rails to be under the rollers when the shuttle is at the upper level, the rollers must have passed through the rails. Thus as seen in FIG. 5, the left-hand upper rail 51 terminates at its left end at a point to leave clearance for the movement of rollers 39 and 40 from the position shown in FIG. 4 through an arcuate path determined by sprocket 33 to the position shown in FIG. 5. As soon as the shuttle 27 starts its movement to the right from the FIG. 5 position, the roller 40 will rest on upper rail 51 and support that end of the shuttle 27.

Near sprocket 33, the rail 51 has a gap 50 through which stud 31 passes as it swings about sprocket 33. Rollers 39 and 40 are spaced more widely than the length of this gap so that one or the other will be supported as they pass over the gap 50, and also as they pass over gap 52 further along.

The gap 52 is provided for the upward arcuate movement of the rollers 41 and 43. As soon as the movement of shuttle 27 to the right from the FIG. 5 position starts, the roller 41 will come into engagement with the portion of rail 51 beyond the gap 52, thereby supporting the right-hand end of the frame 27. The rail 51 may not be continuous from this point to the right-hand end of the machine, however, because it must permit the rollers 39 and 40 to swing down as their bearing link 32 moves around the right-hand sprocket 53. It is for this reason that the additional upper rail 46 at a still higher level is provided. It will be observed that the rails 51 and 46 overlap slightly. Accordingly, before the roller 41 leaves rail 51, roller 43 engages the top of rail 46. Inasmuch as this transition occurs when the bearing link 32 is well spaced from the sprocket 33, it is important that there be no interruption in the support of the shuttle frames by their rollers and rails. Once the roller 43 is supported by the rail 46, the rail 46 may give continuous support for the right end of the shuttle frame until the shuttle frame reaches a position at which its bearing link 32 is directly above the sprocket 53 at which time adequate support through the sprocket 53 is achieved. The next movement will be an arcuate moement in which the roller 43 moves past the rail 46 and downwardly, guided by deflector guide 49, while roller 39 on the other shuttle is guided by deflector guide 54.

ACCURACY OF POSITIONING FOR FORMING OPERATION

Figure 7:
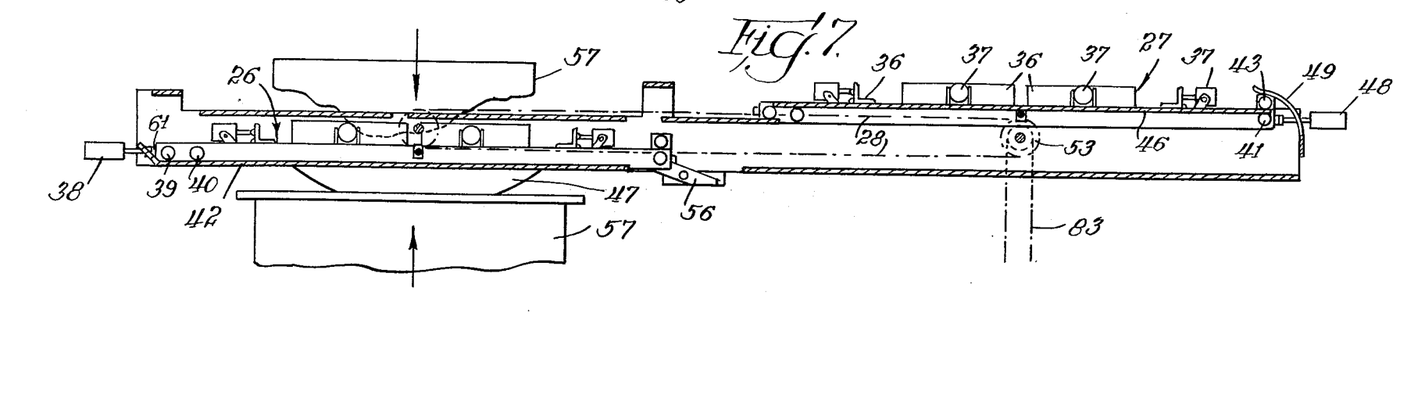

It is important that the shuttles be very accurately positioned when the platens 16 and 17 are raised and lowered to engage the sheet for forming. This is accomplished as seen in FIGS. 6 and 7. While the shuttle frame 26 is supported on bottom rail 42, its trailing end, at the right, moves forwardly over a ratchet 56. Accuracy of positioning is achieved by moving it backwardly against the seat of the pivoted, upwardly biased, ratchet 56, as seen in FIG. 7. Although this could be accomplished by reversing the drive of the chains 28, it is accomplished even more simply in the present instance by the pressure applied by the snorkel mechanisms 38 and 48. Lateral precision is ensured by centering cams 58 on track 42 and 59 on track 46.

After the shuttle 26 (or 27) has been precisely positioned by being backed against the seat of the ratchet 56, the platens 16 and 17 are moved up and down respectively to close the mold 57, carried by the platens 16 and 17, to accomplish the desired thermoforming of the heated plastic sheet 47. After sufficient cooling of the formed sheet 47, the platens 16 and 17 are withdrawn to open the mold 57. This completes a cycle for one shuttle-movement, with the other shuttle now in the FIG. 3 position where the pressure in cylinders 37 is reversed to open the clamps 36 and permit removal of the formed sheet. The cycle is now repeated, although this time using the other one of the two shuttle frames.

SNORKELS

Figure 8:
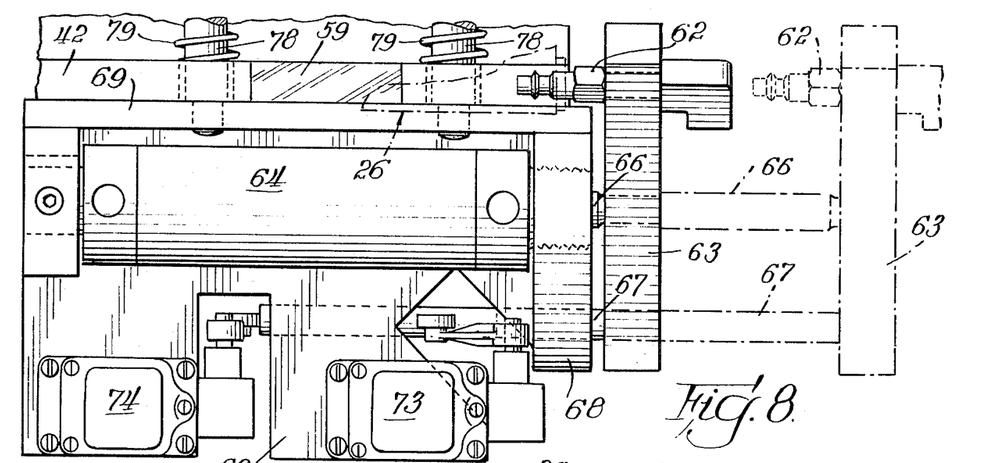
FIGS. 8, 9 and 10 are respectively side, bottom and end views of a snorkel mechanism by which air pressure for controlling the clamps carried by the shuttles is supplied to the clamp operating cylinders on the shuttle frames.
Figure 9:
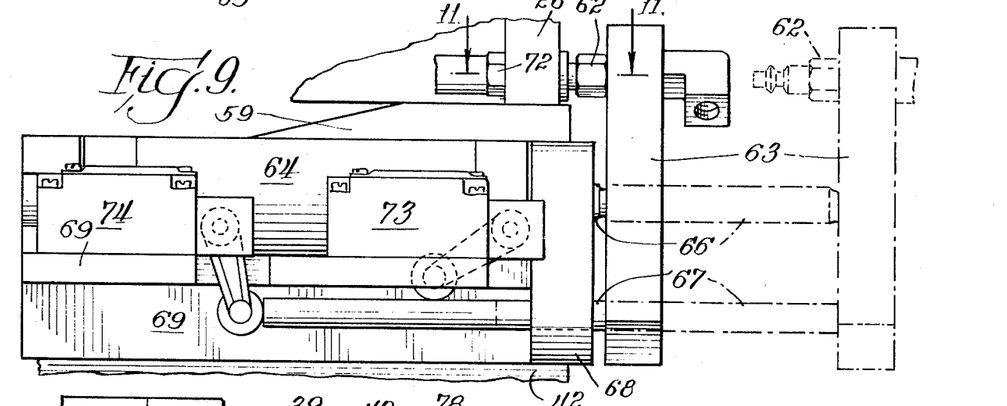
Figure 10:
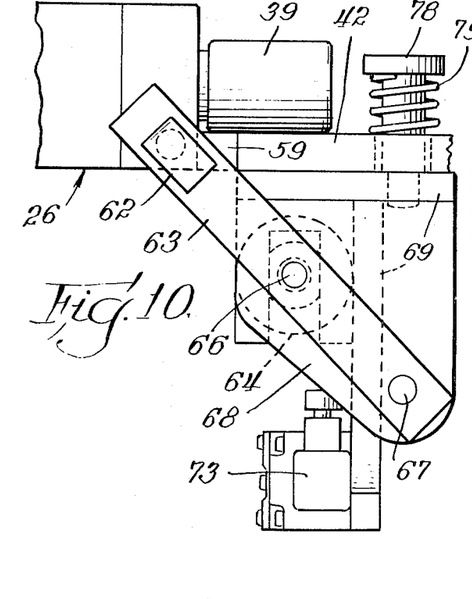
Figure 11:
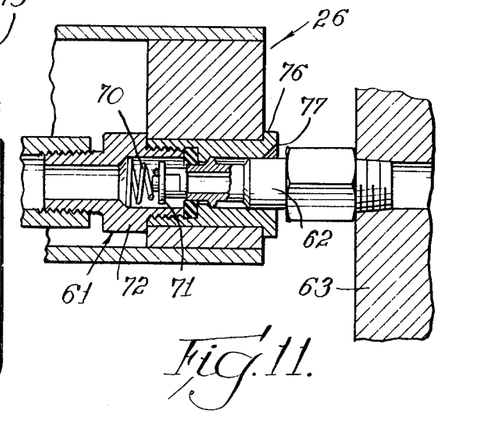
FIG. 11 is a sectional view through the coupler of the snorkel device of FIGS. 8 to 10.

One form of snorkel assembly at present preferred is shown in FIGS. 8 to 10, using a "quick coupler" as shown in FIG. 11. The quick coupler of FIG. 11 is similar to quick couplers available on the market except that the lock-in ball mechanism is omitted. The female coupler assembly 61 is carried by the shuttle frame 36 (or 27) and the male member 62 is carried by a crosshead or plate 63 operated by cylinder 64. More specifically the crosshead 63 is carried by piston rod 66 of the cylinder 64 and by a second slide rod 67 that slides in an end plate 68 of the mounting bracket 69. When the male member 62 is thrust into the female assembly 61, it engages the exposed end of valve member 71 which is normally thrust to the seal position by spring 70. When the male member 62 is thrust home, air may flow between it and the fitting 72. But when the male member 62 is removed, the fitting 72 is again sealed by its valve 71.

As the cylinder 64 moves the crosshead 63 in and out, the guide rod 67 actuates switches 73 and 74 of the type called limit switches. Thus the limit switch 73 signals that the snorkel has been retracted, and the limit switch 74 signals that it has been thrust home for making its connection to the female assembly 61.

The face member 76 of the female assembly 61 is preferably provided with a deeper and wider entry bevel 77 than is customary with "quick connectors" so as to guide the male member 62 into alignment with the female assembly 61. The mounting permits slight lateral movement of the male member 62 as may be required occasionally by such factors as dimensional changes of the shuttles with temperature variations. A suitable mounting is by two studs 78 extending through oversize holes in track 42, each biased by spring 79 to seal bracket 69 against the underside of track 42.

CHAIN DRIVE

Figure 12:
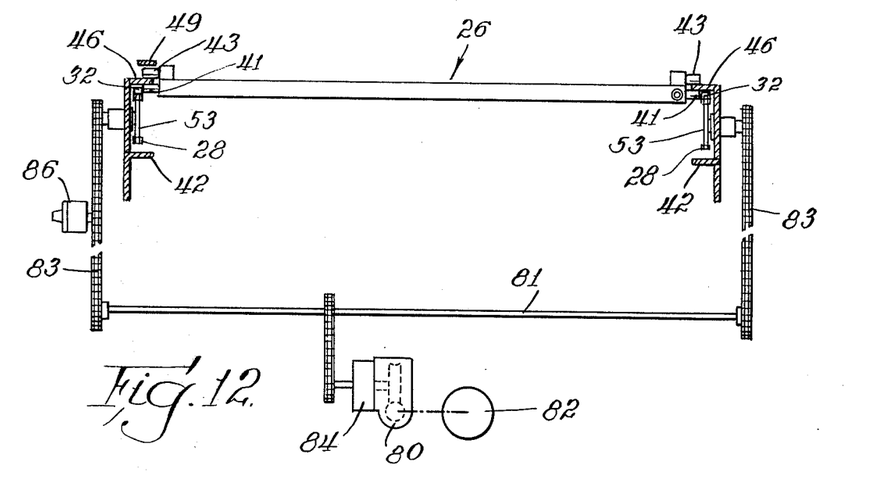
FIG. 12 is a view of vertical sectional nature but principally illustrating the drive of the shuttle chains.

It is of course important that the chains be driven precisely in unison. As shown in FIG. 12, this is accomplished by a cross shaft 81, driven by motor 82, through a worm drive 80, and driving a chain 83 on each side of the machine. The chains 83 each drive one of the sprockets 53 around which the chain 28 passes. In order that the snorkel devices will be able to move the shuttles 26 and 27 slightly rearwardly as previously described, a clutch 84 is provided. This is disengaged automatically when air is supplied to the snorkel cylinders 64. Thus it may be actuated by the same air that actuates the cylinders in the snorkel-advancing direction, or it may be an electrically controlled clutch operated by the contact which causes the opening of a valve to supply this air.

PHASE-RESPONSIVE VARYING SPEED CONTROL

Although it is desirable to move the shuttles rapidly from one section of the machine to the other, a very slow speed of movement is desired at the start of each movement, especially as the shuttles are moved from one level to another during which time they are not fully controlled as to angularity. There should, therefore, be some form of speed-control responsive to the phase of the cycle of operation.

Until timing has been established for regular production of machines, the speed changes are preferably adjustably controlled by a type of commercially available switch known as a "Candy" switch made by Candy Mfg. Co., Inc. of Chicago, Ill. In FIG. 12 a switch box 86 for such Candy switches has been illustrated as being driven by one of the chains 83. In practice, it may be driven instead by a shaft of one of the sprockets. In any event, the cam of each Candy switch is driven one revolution for each shuttling of the shuttles, or two revolutions for each revolution of shuttle chains 28. The nature of Candy switches is that one knob adjusts the length of the dwell of the cam and another knob adjusts the phasing relationship between the cam and the driven source. In the present version of the control, there are two Candy switches one of which, for its selected dwell period, limits the speed to a creep speed. The other Candy switch effective when the creep speed is not compelled by the first Candy switch, limits the speed to a somewhat faster "slow" speed. When neither switch is thus exerting its control, the full speed results, if the motor is being driven. Each of the speeds, and especially the slower speeds, may be accurately set by a potentiometer adjustment. The basic aspects of this speed selection (aside from the present use and the use of such switches as the Candy switches) is available as the Boston Gear DC variable speed motor drive.

Figure 13:
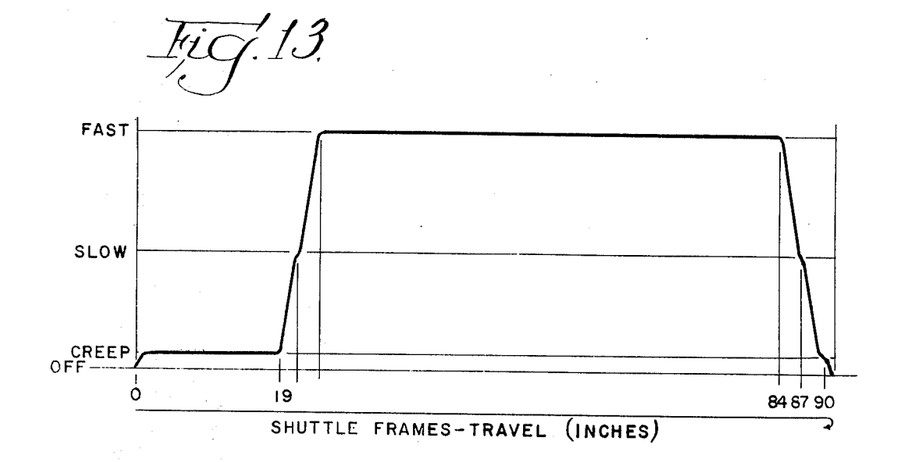
FIG. 13 is a diagram illustrating the points of travel at which various speed-changes in moving the shuttles occur.

In FIG. 13 the vertical line marked 0 represents the starting position at which forming, unloading and loading occurs. In one machine the extent of movement to the next starting position happens to be 90 inches, and so the vertical line at the right is market "90". The successive speeds are shown by the heights over the bottom line. The high speed may be many times the creep speed. When the motor 82 is started, it accelerates smoothly to the creep speed which FIG. 13 assumes continues to the 19-inch position, which carries bearing link 32 half-around sprocket 33 or 53. Then the Candy switch demanding creep speed releases control to the slow speed switch which is set for quickly thereafter releasing its control so that the fast speed is then available. At about the 84-inch position, the slow speed Candy switch takes control and then at about 87 inches the creep Candy switch takes control. At about the 90-inch position the motor is de-energized, but overrun lets the shuttle frames be moved slightly beyond their zero or 90-inch positions so as to be pushed back by the snorkel devices as previously described.

Other forms of limit or position-responsive switches (responsive directly or indirectly to the position of a shuttle) could be substituted, as could a timer for changing from the creeping speed a given time after start of the shuttle movement.

SEQUENCE OF STEPS AND CONTROL ACTUATIONS

Many details of the thermoforming machine need not be set forth or illustrated because conventional. For example, it is conventional to have various controls for the oven, and timers for the heating and forming operations. Likewise, it is conventional to have an oven door 88 in the form of a vertical partition which is lowered automatically at the end of the heating time to allow the drooping sheet to pass from the oven. In the present instance, to avoid altering a standard door, this may be supplemented by a supplemental door or curtain opening by upward movement, at the same time the conventional door opens downwardly. Various conventional features are provided, such as a warning bell, to sound if the start buttons have not been pushed when the heating cycle timer times out; and heat shut off and a cooling air blast actuated a suitable interval later if the start buttons still are not pushed. Also, various choices for the molding operation are available, including partial deforming by mold-thrust and completion by vacuum. Much of the circuitry here used is conventional, and the rest can easily be added (once the concept is understood) by general conventional circuitry practice. It may aid in such additions to list the sequence of major steps, with control actuations related to them as follows:

1. When the forming timer times out, this causes the sheet-clamps of the shuttle in the forming station to open. More specifically, a reversing air value is allowed to return by its spring to its position for connecting the double-acting clamp cylinders 37 (through the already-connected snorkels) in the direction to open the clamps 36.

2. The operator unloads the finished part. He then loads a new sheet and presses a "close clamp" button, in control unit 21, to close the clamps. If the sheet is not correctly positioned, he may reopen the valves by pressing the "open clamp" button, thus causing reversal of the reversing valve.

3. When the sheet is properly clamped, the operator presses the other start button. This permits the following step when the heating timer times out.

4. When the heating timer times out, circuits are actuated by which the snorkels retract and the oven door drops. When the limit switch 73 shows retraction of the snorkel, stop-shuttle switch of Step 5 is temporarily overridden so that motor 82 is energized to begin the forward shuttle movement. Initially, the creep control switch is in the position limiting the speed to a creep speed, having been switched to this position as the shuttle was about to stop. As the shuttles complete their shifting of levels, the creep control switch is switched to yield control to the slow control (if provided) and then full speed follows quickly.

5. The shuttles exchange positions, bringing a hot sheet out of the oven to the forming station, the shuttle there actuating the stop-shuttle limit switch which (having been freed from the override mentioned in Step 4) actuates circuits for the items of the next step.

6. The snorkels now engage, the oven door closes, and the forming platens close on the new sheet. Also, the heating timer and forming timer start.

7. When the forming timer (which is set to allow time not only for forming but for cooling) times out, the cycling is back to Step 1, and the clamp frames release the newly formed part. It is convenient to regard this as a full cycle, even though in one sense it is only a half cycle, because the shuttle mentioned in Step 1 is now in the heating station.

Some manufacturers or users might prefer a clamp system which is self locking to hold the clamps in the closed position. This would make the maintenance of air pressure unnecessary. This can be done, for example, by toggle actuation in which the toggles reach a dead-center position in closing the clamps. Alternatively, at least in theory, the clamps could just be biased to the closed position, but it is deemed safer to use a system in which pressure failure, when the clamps are open, will not cause them to close.

Other systems could be used for moving the shuttles in endless tandem through their vertically looped circuit, always right-side up, but the chain and rail system here disclosed is greatly preferred because of its simplicity as compared to other systems so far conceived.

ACHIEVEMENT

With no extra floor space requirement as compared to previously popular one-shuttle thermoforming machines, the present invention greatly increases productivity and conserves energy. Indeed, the productivity of three-station machines (which are much more costly as to equipment and space) is sometimes equalled and often approached. Conversion of existing one-shuttle machines is feasible. Even in wholly new machines, manufacturing costs are reduced (and dangers of new machine "bugs" reduced) by being able to use many standard parts of the popular one-shuttle machine.

We claim:

1. A two-shuttle apparatus for a thermoforming machine which includes only two stations, a heating station, and a forming and loading station spaced generally horizontally from the heating station; said apparatus including a pair, only, of sheet-carrying shuttles having sheet-clamps thereon; means for moving the shuttles in endless tandem, with each shuttle passing through the entire of a vertically looped circuit to pass directly between and stop only at said stations repeatedly in an uninterrupted continuous sequence, while maintaining the shuttles right-side up, said means moving the shuttle moving toward the heating station above the shuttle moving from the heating station.

2. A two-shuttle apparatus for a thermoforming machine which includes only two stations, a heating station, and forming and loading station spaced generally horizontally from the heating station; said apparatus including a pair, only, of sheet-carrying shuttles having sheet-clamps thereon; means for moving the shuttles in endless tandem, with each shuttle passing through the entire of a vertically looped circuit to pass directly between and stop only at said stations repeatedly in an uninterrupted continuous sequence, while maintaining the shuttles right-side up; rails for supporting the shuttles as the shuttles are moved in one direction from the heating station along the lower run of the circuit and in the opposite direction toward the heating station at a higher level along the upper run of the circuit.

3. A two-shuttle apparatus for a thermoforming machine which includes a heating station and a forming and loading station spaced generally horizontally from the heating station; said apparatus including a pair of sheet-carrying shuttles having sheet-clamps thereon; means for moving the shuttles in endless tandem, with each shuttle passing through the entire of a vertically looped circuit to pass in the forward direction between and stop only at said stations repeatedly in an uninterrupted continuous sequence, for heating at the heating station and for forming, unloading and loading at the other station while maintaining the shuttles right-side up; and snorkel means for moving into engagement with the shuttles to supply clamp-operating fluid pressure for said sheet-clamps to the shuttles while the shuttles are stationary;

said snorkel means exerting a rearward thrust on the shuttle; and ratchet means cooperating with the said rearward thrust to limit the rearward movement of the shuttle induced by said thrust, thereby achieving its exact positioning for the thermoforming step.

4. A two-shuttle apparatus for a thermoforming machine which includes only two stations, a heating station, and a forming and loading station spaced generally horizontally from the heating station; said apparatus including a pair, only, of sheet-carrying shuttles having sheet-clamps thereon; means for moving the shuttles in endless tandem, with each shuttle passing through the entire of a vertically looped circuit to pass directly between and stop only at said stations repeatedly in a uninterrupted continuous sequence, while maintaining the shuttles right-side up, said means moving the shuttle moving toward the heating station above the shuttle moving from the heating station;

said means for moving the shuttles including a pair of parallel chains looped in vertical planes and each extending about and having both runs extending horizontally between a pair, only, of spaced sprockets, the shuttles being located between the chains, and each shuttle being constantly connected to the chains by connecting structure pivotable about an axis approximately midlength of the shuttle along the chains and extending horizontally and perpendicularly to the length of the chains, with the axes for the two shuttles spaced along the chain.

5. A two-shuttle apparatus for a thermoforming machine which includes only two stations, a heating station, and a forming and loading station spaced generally horizontally from the heating station; said apparatus including a pair, only, of sheet-carrying shuttles having sheet-clamps thereon, means for moving the shuttles in endless tandem, with each shuttle passing through the entire of a vertically looped circuit to pass directly between and stop only at said stations repeatedly in an uninterrupted continuous sequence, while maintaining the shuttles right-side up;

said means for moving the shuttles including a pair of parallel chains looped in vertical planes and each extending about and having both runs extending horizontally between a pair, only, of spaced sprockets, the shuttles being located between the chains, and each shuttle being constantly connected to the chains by connecting structure pivotable about an axis approximately midlength of the shuttle along the chains and extending horizontally and perpendicularly to the length of the chains, with the axes for the two shuttles spaced along the chain, support rollers projecting from the shuttles on each side thereof, and rails for supporting the shuttles through said support rollers at a lower level as the shuttles are moved from the heating station by the lower runs of the chains and in the opposite direction at a higher level by the upper runs of the chains, the rails for the upper runs being dimensioned to permit passage, through or vertically around the ends of the rails, of the support rollers and an element of the pivotal structure during their respective semicircular movements as the chain sections carrying the pivotal structures pass around and in contact with the sprockets, said dimensioning including gaps in the vicinity of the sprockets;

said support rollers being substantially spaced from said pivotal structure lengthwise of the rails and serving to maintain the shuttles level by cooperation with the rails when moving along the rails and by cooperation with other fixed structure in guiding said support rollers when the shuttle moves around a sprocket.

6. A two-shuttle apparatus for a thermoforming machine which includes only two stations, a heating station, and a forming and loading station spaced generally horizontally from the heating station; said apparatus including a pair, only, of sheet-carrying shuttles having sheet-clamps thereon; means for moving the shuttles in endless tandem, with each shuttle passing through the entire of a vertically looped circuit to pass directly between and stop only at said stations repeatedly in an uninterrupted continuous sequence, while maintaining the shuttles right-side up;

said means for moving the shuttles including a pair of parallel chains looped in vertical planes and each extending about and having both runs extending horizontally between a pair, only, of spaced sprockets, the shuttles being located between the chains, and each shuttle being constantly connected to the chains by connecting structure pivotable about an axis approximately midlength of the shuttle along the chains and extending horizontally and perpendicularly to the length of the chains, with the axes for the two shuttles spaced along the chain, support rollers projecting from the shuttles on each side thereof, and rails for supporting the shuttles through said support rollers as the shuttles are moved from the heating station by the lower runs of the chains and in the opposite direction at a higher level by the upper runs of the chains, the rails for the upper runs being dimensioned to permit passage, through or vertically around the ends of the rails, of the support rollers and an element of the pivotal structure during their respective semicircular movements as the chain sections carrying the pivotal structures pass around and in contact with the sprockets, said dimensioning including gaps in the vicinity of the sprockets;

said support rollers being substantially spaced from said pivotal structure lengthwise of the rails and serving to maintain the shuttles level by cooperation with the rails when moving along the rails and by cooperation with other fixed structure in guiding said support rollers when the shuttle moves around a sprocket; and the support rollers and rails being arranged to provide support for the shuttles throughout their movement except while said axes are in the immediate vicinity of the sprockets to be adequately supported by them.

7. A two-shuttle apparatus for a thermoforming machine which includes only two stations, a heating station, and a forming and loading station spaced generally horizontally from the heating station; said apparatus including a pair, only, of sheet-carrying shuttles having sheet-clamps thereon; means for moving the shuttles in endless tandem, with each shuttle passing through the entire of a vertically looped circuit to pass directly between and stop only at said stations repeatedly in an uninterrupted continuous sequence, while maintaining the shuttles right-side up;

said means for moving the shuttles including a pair of parallel chains looped in vertical planes and each extending about and having both runs extending horizontally between a pair, only, of spaced sprockets, the shuttles being located between the chains, and each shuttle being constantly connected to the chains by connecting structure pivotable about an axis approximately midlength of the shuttle along the chains and extending horizontally and perpendicularly to the length of the chains, with the axes for the two shuttles spaced along the chain, support rollers projecting from the shuttles on each side thereof, and rails for supporting the shuttles through said support rollers as the shuttles are moved from the heating station by the lower runs of the chains and in the opposite direction at a higher level by the upper runs of the chains, the rails for the upper runs being dimensioned to permit passage, through or vertically around the ends of the rails, of the support rollers and an element of the pivotal structure during their respective semicircular movements as the chain sections carrying the pivotal structures pass around and in contact with the sprockets, said dimensioning including gaps in the vicinity of the sprockets;

said support rollers being substantially spaced from said pivotal structure lengthwise of the rails and serving to maintain the shuttles level by cooperation with the rails when moving along the rails and by cooperation with other fixed structure in guiding said support rollers when the shuttle moves around a sprocket; and the support rollers and rails being arranged to provide support for the shuttles throughout their movement except while said axes are in the immediate vicinity of the sprockets to be adequately supported by them;

said support rollers including a pair of rollers spaced apart slightly more than the length of a rail gap they pass over, to avoid a hiatus of support as they pass over the gap.

8. A thermoforming machine including as its only stations a heating station and a forming and loading station; two pairs of sprockets with one sprocket of each pair rotatable on an axis at the heating station and the other sprocket of each pair rotatable on an axis parallel to the first axis but at the forming and loading station; a loop of chain for each pair of sprockets passing around each of the sprockets of the pair and having upper and lower runs both extending substantially horizontally directly between the sprockets of the pair; a pair, only, of shuttles carried by and between the chains and spaced along the chains so that while one shuttle is at the heating station, the other shuttle is at the forming and loading station, each shuttle being constantly connected to the chains by pivotal means having a horizontal axis perpendicular to the chains and at the middle of the shuttle lengthwise of the chains; and means for driving the chains intermittently to move one shuttle from the heating station to the forming and loading station while moving the other shuttle along a higher level from the forming and loading station to the heating station, with successive such movements in the same direction about the chain loop, and for stopping the chains to hold one shuttle at the heating station and the other at the forming and loading station; and rails along each run of each chain for supporting the shuttles in their stopped positions and as their pivotal means move between sprockets.

* * * * *

UNITED STATES PATENT OFFICE
CERTIFICATE OF CORRECTION

Patent No. 4,043,736  Dated August 23, 1977

Inventor(s) Philip J. Andres, IV, et al.

It is certified that error appears in the above-identified patent and that said Letters Patent are hereby corrected as shown below:

Column 1, line 9, after "sheet" insert -- of --.

Column 1, line 12, delete "form" after "to".

Column 1, lines 13, 14 delete "and when sufficiently heated, moved to a forming position,"

Column 1, line 46, after "have" second occurrence, insert -- been --.

Column 1, line 52, "provided" should be -- required --.

Col. 3, ls. 9, 10   insert parentheses around "by movements forwardly around a circuit"
Col. 3, l. 23       insert a comma (,) after "by" first occurrence
Col. 3, l. 23       before "by", second occurrence, insert --moved--
Col. 6, l. 16       "36" should be --26--
Col. 6, l. 44       "seal" should be --seat--
Col. 7, l. 36       "market" should be --marked--
Col. 8, l. 20       "value" should be --valve--
Col. 9, l. 37       before "forming" insert --a--
Col. 10, l. 11      after "repeatedly in" change "a" to --an--

Signed and Sealed this

Sixth Day of December 1977

[SEAL]

Attest:

RUTH C. MASON  
*Attesting Officer*

LUTRELLE F. PARKER  
*Acting Commissioner of Patents and Trademarks*